(12) United States Patent
LaRosa

(10) Patent No.: US 6,237,535 B1
(45) Date of Patent: May 29, 2001

(54) CONTAINER FOR STORAGE AND/OR SHIPMENT OF LIVE CRUSTACEANS

(75) Inventor: Leonardo LaRosa, Reading, MA (US)

(73) Assignee: Rose Seafood Industries, Inc., Woburn, MA (US)

( * ) Notice: Subject to any disclaimer, the term of this patent is extended or adjusted under 35 U.S.C. 154(b) by 0 days.

(21) Appl. No.: 09/373,327

(22) Filed: Aug. 12, 1999

Related U.S. Application Data

(60) Provisional application No. 60/096,268, filed on Aug. 12, 1998.

(51) Int. Cl.[7] .............................. A01K 61/00; B65D 1/36
(52) U.S. Cl. ...................... 119/201; 206/472; 220/4.23; 220/507
(58) Field of Search .................................. 119/201, 202, 119/209; 206/472, 473; 220/507, 4.23

(56) References Cited

U.S. PATENT DOCUMENTS

| 1,639,555 | 8/1927 | Clark | 119/2 |
|---|---|---|---|
| 2,266,664 | 12/1941 | Stevens | 119/2 |
| 2,680,424 | 6/1954 | Brown | 43/55 |
| 3,958,359 | 5/1976 | Doughty | 43/55 |
| 4,501,361 | * | 2/1985 | Rose, Jr. | 206/493 |
| 4,518,275 | * | 5/1985 | Rauch, III et al. | 402/80 P |
| 5,005,703 | * | 4/1991 | Bodker | 206/563 |
| 5,042,260 | 8/1991 | George, Sr. | 62/60 |
| 5,050,335 | 9/1991 | Hisey | 43/55 |
| 5,085,879 | 2/1992 | Elbaz | 426/129 |
| 5,218,923 | * | 6/1993 | Larosa . | |
| 5,373,944 | * | 12/1994 | Ishitsuka | 206/444 |
| 5,544,748 | * | 8/1996 | Kollinek | 206/387.13 |
| 5,555,845 | 9/1996 | Flynn | 119/201 |
| 5,577,614 | 11/1996 | Palmeroni, Jr. et al. | 206/521 |
| 5,609,250 | * | 3/1997 | Moser | 206/387.13 |

FOREIGN PATENT DOCUMENTS 2 306 140  10/1976  (FR) .

* cited by examiner

Primary Examiner—Thomas Price
(74) Attorney, Agent, or Firm—Hamilton, Brook, Smith & Reynolds, P.C.

(57) ABSTRACT

A blank for forming a multi-sided container suitable for storing and/or shipping live crustaceans, such as lobsters, shrimp, and crayfish is disclosed. The blank has a base member to which one or more thermal conditioning wall members are foldably connected. In addition, one or more infiltration barrier wall members are foldably connected to the base opposite the thermal conditioning wall member or members. The thermal conditioning wall member or members and infiltration wall member or members have partial side wall members extending substantially orthogonally from them in an aligned relationship. Thus, the thermal conditioning wall member and infiltration barrier wall member can be folded to bring their partial side wall members into contact, thereby forming one or more multi-sided containers for live crustaceans.

5 Claims, 15 Drawing Sheets

CONTAINER FOR STORAGE AND/OR SHIPMENT OF LIVE CRUSTACEANS

RELATED APPLICATION

This application claims the benefit of U.S. provisional application 60/096,268, filed on Aug. 12, 1998, the entire teachings of which are incorporated herein by reference.

BACKGROUND OF THE INVENTION

For many years, there has been large demand for live lobsters at areas distant from where the lobsters are harvested. To satisfy this demand, lobsters have been packaged and shipped great distances, including shipment by air transport.

In many instances, live lobsters were simply placed in large cartons, such as cardboard cartons lined with suitable insulation, for shipment. Ice, refrigerated gel packs or other cooling means were added to lower the temperature of the lobsters during shipment. Unfortunately, many of the lobsters were damaged or died during shipment in such containers due to injury resulting from their inevitable contact and smashing together caused by such handling and shipment.

An attempt to overcome such problems resulted in the shipping container described in U.S. Pat. No. 5,042,260. The container described in this patent is a carton large enough to accommodate a plurality of live lobsters with an intersecting array of partition walls introduced into the container to subdivide its interior into a plurality of compartments. Each compartment is configured to receive a single live lobster.

An improved container is disclosed in U.S. Pat. No. 5,218,923. The container described in this patent comprises a bottom section having a plurality of lobster holsters, each suitable for containing the body and tail of a single lobster in a manner which supports the claws of the lobster at the elbow. This container has an upper section with an interior void suitable for containing cooling means for the lobsters contained in the holsters within the bottom section of the container. The holsters provided by this container provide shock protection, hold the lobsters snugly in place in the event the box is tipped and provide supplemental thermal insulation to each individual lobster in addition to that provided by the outside walls of the container. Suspending the lobsters in the holsters of this container allows the lobsters to spread their claws providing access to the gill portions of the lobsters to facilitate the introduction of moisture and lower temperatures to the gills during shipment.

While the lobster container described in the aforementioned patents provide substantial advantages over the use of cardboard cartons and the like, they still have certain drawbacks. They are, for example, designed to contain only one specific crustacean, namely the clawed lobster, Homarus Americanus. They are not practical for shipping lobsters or other crustaceans having significant size variations nor for crustaceans having significant shape variations from Homarus Americanus, such as Spiny lobsters, crabs or shrimp.

In addition, these containers are generally limited to top-down cooling which provides uneven and uncontrollable temperature gradients between the top and bottom of the container. This can present serious problems since it is scientifically documented that temperature directly affects the health and mortality of crustaceans. Top-down cooling often results in hot spots, wide temperature swings and severe temperature gradients throughout the container. Additionally, there is no ability in these containers to regulate or provide higher temperatures for warmer water animals.

In general, these containers are designed for holding lobsters for short periods of time outside of their natural water environment. They are generally not designed for reuse and are certainly not designed to facilitate the storage of lobsters or other crustaceans in a wet holding facility. The use of such containers results in the lobsters being packed, unpacked and repacked several times between the point at which they are caught and the ultimate consumer. These containers do not have the ability to hold lobsters in sea water or a cooking vessel.

SUMMARY OF THE INVENTION

This invention relates to a blank for a multi-sided container for live crustaceans. This blank comprises a base member with one or more thermal conditioning wall members foldably connected to it. In addition, thermal infiltration barrier wall members opposite to the thermal conditioning wall member or members are also foldably connected to the base. The thermal conditioning wall member or members and infiltration wall member or members have partial side wall members extending substantially orthogonally from them in an aligned relationship whereby the thermal conditioning wall member or members and the infiltration barrier wall member or members can be folded to bring their partial side wall members into contact, thereby forming a multi-sided container for live crustaceans having one or more compartments.

The crustacean container of this invention is designed to hold and transport live crustaceans in or out of their natural environment. Crustaceans for this application include all types of lobsters, shrimp, prawns, crabs, fresh water crayfish or all animals in the biological classification of Crustacea. The container can be formed to fit each animal's anatomical shape and size. Temperatures can be adjusted by using different warming, cooling or freezing mediums and/or varying the thermal conductivity of the materials of construction. Conditioning circulation can be adjusted to control the air or water flow on one side or all sides of the animal. Shippers can reduce costs while improving product quality using this crustacean container. The custom shapes make it quick and easy to pack the animals. They can be packed by the fisherman on the boat, transferred through the various distributions and holding facilities, and boiled in the pot without reducing the quality of the animal by stressful handling during this long process. The shipper also has the flexibility of using any type or size outer packaging and the ability to reduce shipping and storage costs when the containers are empty by utilizing the nesting feature of the blanks for the container.

Biologically out of the water, the crustacean container provides the animals isolation, physical protection, humidity plus an even and controlled ambient temperature without stressful wide temperature swings and gradients. In the water, the crustacean container provides stress limiting isolation in a protected den, thus eliminating the need to fight for territories within the tank. The animals stay healthier. They can also be transferred from the fishing boat to the holding tanks of the various distributors, to the air cargo packers, to the distant last level distributor and to the consumer's cooking pot without the stresses caused by handling each individual lobster.

This crustacean container provides the shippers and their customers with a wide range of flexibility in holding and shipping options regardless of their geographical location. The nesting design of the open crustacean container gives the ability to pack a large quantity of crustacean containers in a relatively small amount of cubic volume. This gives shippers in remote seacoast areas of industrialized countries or newly industrialized countries access to the product at more reasonable freight costs. The ability to immerse the crustacean container in water allows the storage of animals in wet holding systems. Animals can be pre-graded and packed when labor is readily available and cheap. At shipping time, the animals can be drained and packed into an outer container without the stress of being directly touched again. Receivers of the animals can inspect the animals without removing them from the crustacean containers and can place the module directly into their tanks upon receipt, thus eliminating another stressful handling operation. The operation is again repeated when they are repacked by the receiver and shipped to another distributor or the ultimate customer. The structurally independent modular design of the crustacean container allows the flexibility of selecting any size or type outside shipping or storage container. The outer container can be selected to pack a large number or small number of animals per unit. Using different size crustacean container modules, one type of outer container can contain jumbo animals and small animals efficiently. The outer container can be non-insulated or insulated with varying thickness and insulating values. The modules are designed to conform to animals of different sizes, shapes and species. Different size modules can be mixed within an outer container to allow a wide range of sizes to be packed in the same box with each animal having a properly fitting cell. This unique design also eliminates the need for costly, volume consuming, labor intensive and unsanitary fillers and insulators such as organic straws, excelsior, cardboard, wood chips, newspapers, bubble packs, foam rubber, etc.

The crustacean container's unique design has a thermal conditioning wall with the ability to be configured to the shape of the animal and the animal's specific temperature requirements. The thermal conditioning wall can be perforated with various configurations to control the cooling flow to all or specific parts of the animal. The wall can also be insulated to reduce the temperature conduction for warmer water or tropical animals.

The crustacean container is designed to accommodate a variety of crustaceans. The flexibility in design accommodates various sizes, quantities and temperature requirements. It consists of a one piece formed unit that when laid flat is shaped to provide nesting of stacked units for compact storage and low cost shipping to packers. When ready to use, the design folds along predetermined hinges and is strongly held together with a series of strategically located locking devices. When locked together, the clamshell-like device forms a plurality of environmental chambers which will isolate, cushion, condition and restrain each animal. A crustacean container can be fabricated to hold any specified number of animals, and any number of crustacean container modules can be placed into any size or type shipping container. Thermal coolers could be used for long distance shipping or simple cardboard containers for shorter shipments where very high densities minimal insulation is required.

The crustacean container's two hollow side walls act to isolate the animal and as ventilating ducts which can be perforated according to the animal's temperature requirements. The thermal conditioning wall is uniquely angled and shaped to serve several functions. The bottom portion is shaped to accommodate the physical shape of the conditioning medium and the top section is shaped to follow the physiological shape of the animal. A larger thermal conditioning chamber can be constructed by placing two crustacean containers back to back. Shaping the wall to the specific animal minimizes the movement of the animal, thus consuming less oxygen. In addition, it can utilize the animal's appendages for support and shock absorption. Utilizing different elevations of the thermal conditioning wall optimizes the container volume to maximum density per cubic inch, giving lower transportation costs. The entire thermal conditioning wall serves as a header duct that can distribute the cool air to and through the side walls surrounding each animal, or it can restrict the air from entering the side walls for warmer animals. Unlike conventional containers, the thermal conditional wall design facilitates the maintenance of equal temperatures between the top and bottom of the container. Temperature control can also be affected by rotating the sensitive parts onto or away from the thermal conditioning wall. For example, the sensitive side of cold animals could be rotated toward the thermal conditioning wall or the sensitive parts of the warm water animals could be rotated away from the thermal conditioning wall. Further temperature control can also be accomplished by using different materials to form the crustacean container. The wall can be constructed with thermal conducting materials for direct transfer to the animals and thermal insulating materials for indirect transfer to the animals. The wall opposite the thermal conditioning wall is the infiltration barrier wall. It is placed along the outer shipping container's inside perimeter and shaped to fit the form of the animal. The air space formed between this wall and the inside wall of the shipping container also provides additional insulation and a means of directing the perimeter convection flow. The floor of the crustacean container can be perforated to serve two functions. These perforations function as waste drain holes during shipping and for water circulation while the containers are in holding systems. Unlike other partitioned containers, the unpacking time is very fast. There is no struggling to remove soggy materials, expanded polystyrene (EPS) beads or other messy debris. The hinged clam shell is simply opened, as a book, and all of the animals are easily accessible for removal.

The crustacean container can be loaded with animals well in advance of actual shipping time, placed in the wet holding system, and then placed in the outer shipping container at the last possible moment. This will allow the labor intensive grading and packing to take place when the labor resources are available. The modular aspect of the crustacean container allows the packer to define the number of crustacean containers packed into each shipping container. When the consignee receives the animals, the crustacean container modules can be placed into the wet system without handling and stressing each lobster. When the consignee ships an order, the consignee can remove only the required quantity of crustacean containers, without additional handling labor and stress to the animals.

The crustacean container can be constructed of many moldable materials. It can be totally impervious to moisture. It can also be constructed so as not to generate contaminants or particles while it is being handled. Some material choices may be transparent for visual non-contact quality assessment, or opaque materials may be used for marketing appeal. Food grade or non-food grade materials can be employed. Using high temperature materials, the animals can be cooked within the module, thus reducing the risk of injury and the discomfort associated with touching a live animal. Thickness of the material can be varied for different requirements. Thick materials may be used for greater structural integrity which may be required for greater shipping protection or for reusable modules. The use of thinner materials may be an option for smaller animals, to lower costs or for disposable units, when protection is not as critical.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION OF THE INVENTION

The above features and other details of the crustacean container of this invention will now be more particularly described with reference to the accompanying drawings and pointed out in the claims. The same number present in different figures represents the same item. It will be understood that the particular embodiments for the invention are shown by way of illustration and not as limitations of the invention. The principal features of the invention can be employed in various embodiments without departing from the scope of the invention.

Figure 1:
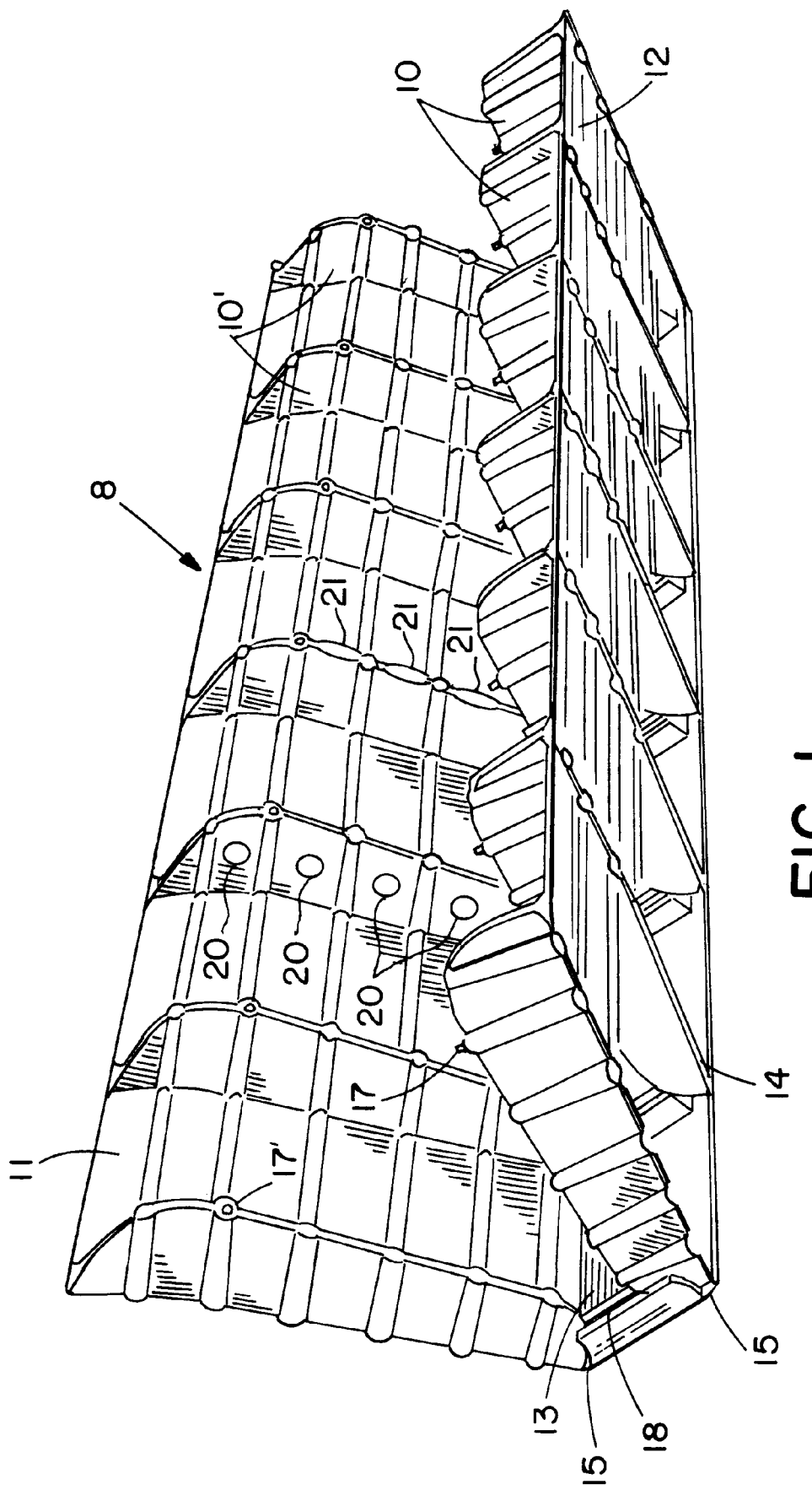
FIG. 1 is a perspective view of a partially closed blank for a crustacean container according to this invention which, when folded into place, provides a crustacean container having six crustacean compartments.

A partially closed blank 8 for a crustacean container suitable for six crustaceans is depicted in FIG. 1. Blank 8 contains side walls 10 and 10', thermal conditioning wall 11, infiltration barrier wall 12 and module floor 13. The unassembled blank 8 lays flat in its unfolded position and its geometry is designed to allow voids 14 of the side walls 10 and 10' to nest into each other for high density economical storage and transportation. Assembly is accomplished simply by folding blank 8 at two folding hinges 15 joined to the blank floor 13. The blank floor 13 can be perforated to allow drainage of animal waste out of the module or for enhanced water circulation while the container is in a water holding system.

Blank 8 can be constructed using a wide variety of forming processes. It can, for example, be thermo-formed, vacuum formed or produced by other molding and/or forming techniques. This allows great flexibility in forming compound shapes, which is not usually possible with EPS, sheet plastics or cardboard. This also provides for the ability to use a wide range of water and moisture resistant materials and laminates to address each crustacean's and each shipper's specific requirements. For example, the material can be thermally conductive, insulating or a laminated combination. It can be economically molded or die cut to provide custom ventilating configurations. It can also be thick for applications with larger animals requiring superior structural integrity or durability for constant reuse. On the other hand, it can be thin for lightweight disposable applications or smaller animals. The material can be transparent for animal visibility or can be an opaque coloring for various marketing reasons. It can also be made to withstand the low temperature of dry ice or other cooling means or the high temperature of boiling water.

The folded container is held together by locking devices formed by tabs 17 located on an edge of the side walls 10 and intended to be inserted into companion receiving holes 17' on the opposite edges of side walls 10'. Locking base 18 also helps lock the side walls 10 and 10' into the closed container position. When the cells are locked into place, they form rigid self-supporting compartmentalized modules. The shape and curvature of side walls 10 and 10' can be shaped to conform to specific animal anatomies. In addition to providing isolation, side walls 10 and 10' can provide the vital function of temperature control. Using thermally conductive material, they can act as cooling or heating plates. Also, each wall can be punched or trimmed to provide a variety of ventilating schemes for heating or cooling. For example, holes 20 can be punched in various locations along the side walls 10 or the side walls 10 can include vents 21 positioned along the leading edge of side walls 10, or both.

The dimensions of the crustacean container will vary depending upon its ultimate use. As an example, if the six compartment container illustrated in FIG. 1 is designed for clawed lobsters, it might have an overall length of about 21½ inches, a width of about 4 inches and a height about 8½ inches.

Figure 2:
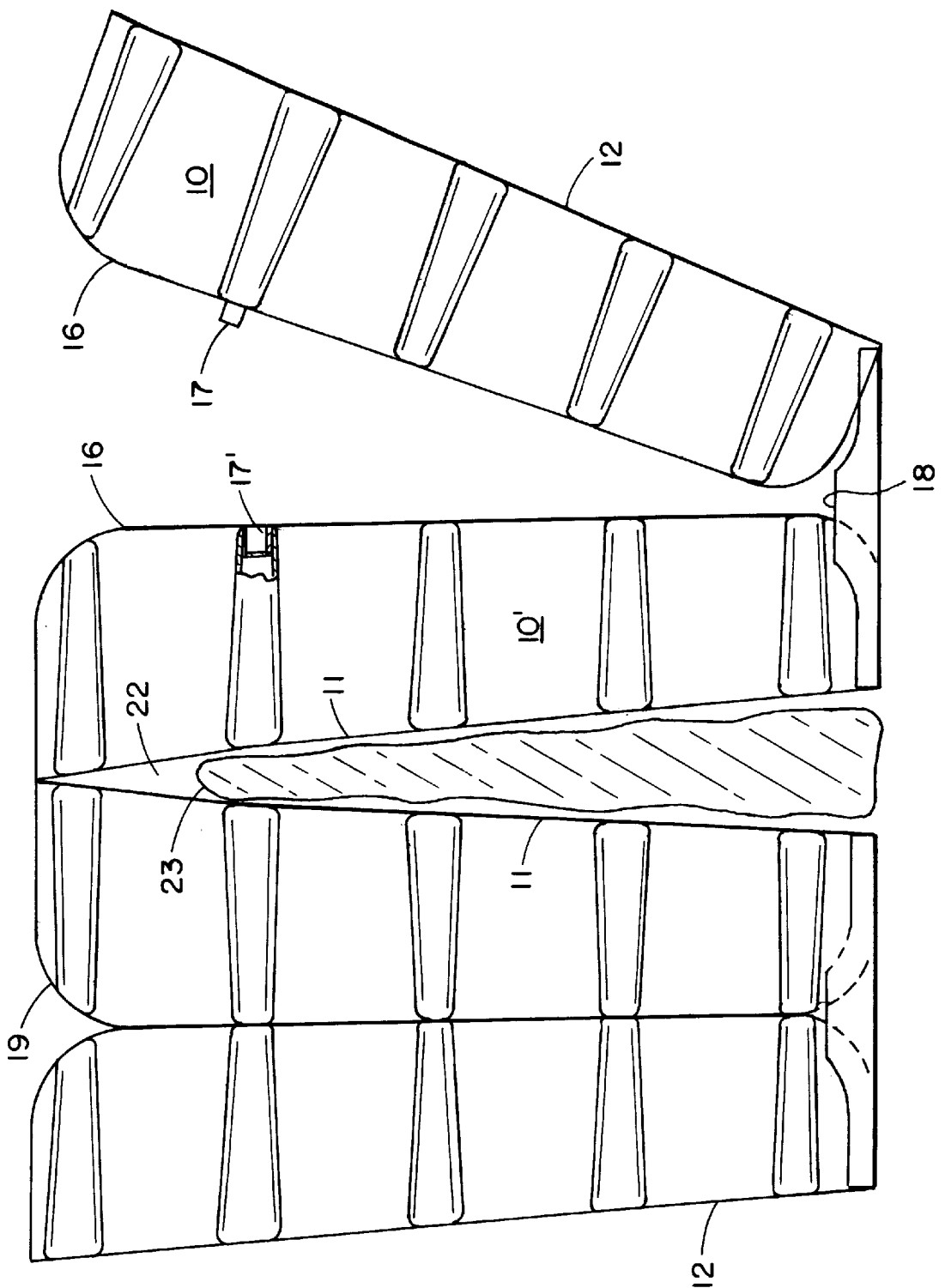
FIG. 2 is an end view of two crustacean containers of FIG. 1 positioned back-to-back, with one fully closed and one partially closed illustrating, inter alia, the positioning of conditioning medium in a thermal conditioning chamber formed between the backs of the two containers.

FIG. 2 illustrates how two containers of FIG. 1 might be placed in a back-to-back relationship providing a thermal conditioning chamber 22 in which temperature conditioning medium, such as a gel pack 23, might be placed.

Thermal conditioning wall 11 serves several functions. The entire surface of wall 11, when containers are placed in a back-to-back relationship as in FIG. 2, provides a chamber 22 in which thermal conditioning medium, such as gel pack 23, can be placed. The upper portion of wall 11 can be shaped to conform to the particular crustacean to be packed. For example, the upper portion of wall 11 can be shaped and angled to form a support and nest for the specific animal. The multiple functions of the surface of wall 11, at different elevations, ensure the maximum utilization of the critical internal space of each compartment. The entire wall, its upper and lower portions, can be used as a thermal conditioning surface, a main thermal distribution duct or a combination of both. Materials of construction can be selected to best fit the thermal requirements for the specific crustacean to be packed. This will ensure the control of temperature throughout the entire module at all elevations within the compartment.

Infiltration barrier wall 12 is positioned opposite the thermal conditioning wall 11. The infiltration barrier wall 12 can also be shaped to fit the specific animal. It also directs the convection or the air infiltrating the outer container and forms one of the five walls defining the cell. Side walls 10 can also act as infiltration barriers.

Unloading the container is achieved by simply unlocking the side wall locks by pulling the thermal conditioning wall 11 and infiltration barrier wall 12 apart, thereby exposing the crustaceans. Crustaceans can be easily and quickly removed piece by piece or simply dumped. Because the animals are totally exposed, there is no additional stress placed on the animals by having to pull or force their appendages that may be embedded in the fixed side of containers of the prior art.

Figure 3:
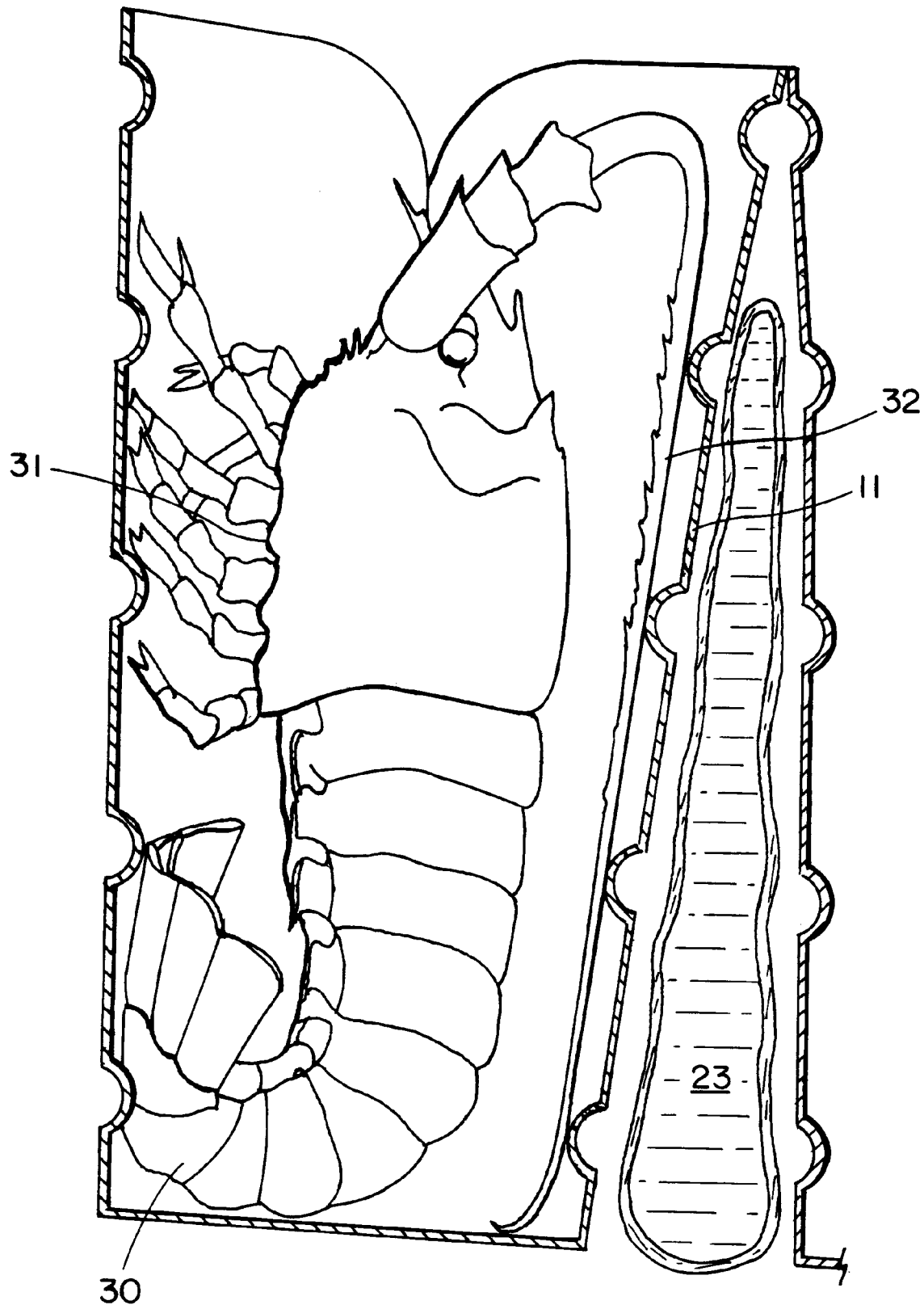
FIG. 3 is a cut-away side view illustrating the positioning of a Spiny lobster in one compartment of a crustacean container according to this invention.

A typical use for the crustacean container of the present invention, namely in containing Spiny lobsters, is illustrated in FIG. 3. The treatment of the antennae on Spiny lobsters is critical to the lobsters' health. They are sensory, offensive and defensive weapons. The objective is to restrict and anesthetize them while maximizing the container volume. As shown in FIG. 3, the Spiny lobster is placed into the crustacean container with its tail 30 at the bottom of the compartment and its temperature sensitive underside 31 facing away from thermal conditioning wall 11. The antennae 32 are bent backward along the back side of the Spiny lobster to achieve several functions. First, the rigid antennae hold the warmer water animal away from direct contact with the cooler thermal conditioning wall 11. Second, the extra-sensitive sensory receptors along the antennae are anesthetized by being in direct contact with the thermal conditioning wall 11. Cooling of the antennae reduces the activity of the animal and thus reduces stress during shipment. Third, the tensions the antennae placed against the thermal conditioning wall 11 wedge the lobster into its compartment, thus reducing movement during handling. The method of folding the antennae back also facilitates easier and faster packing. Once placed into the compartment, the lobster is immobilized, unlike conventional packing where one must hold the animal in place with one hand while trying to pack filler materials around the moving animal to keep it mobile. When the container, with the animal inside, is placed in a holding tank, the restricted antennae cannot be used by the animal in an aggressive manner, thus reducing stress and improving quality.

Figure 4:
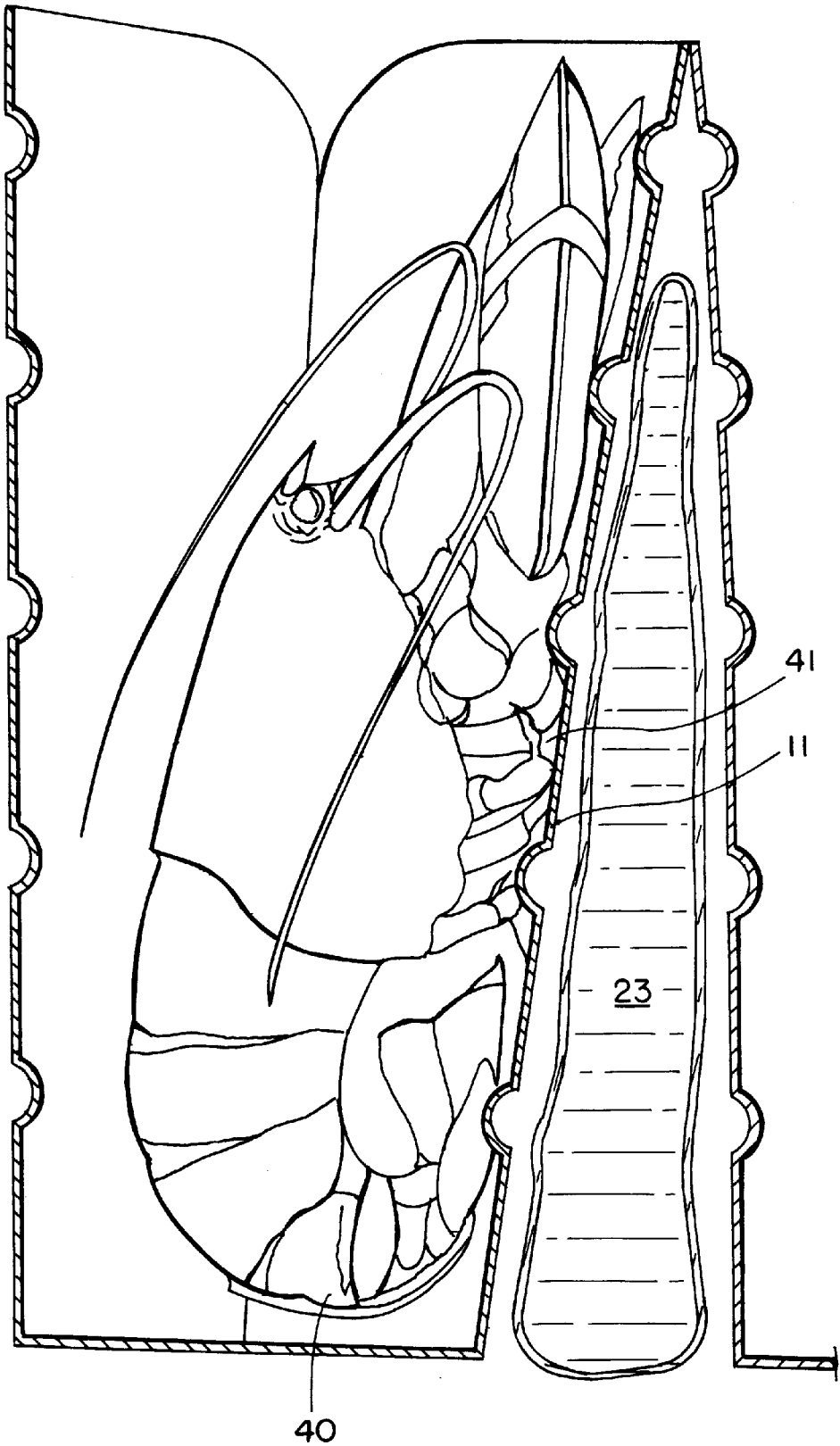
FIG. 4 is a cut-away side view illustrating one option for packing a clawed lobster in a compartment of a crustacean container according to this invention.
Figure 5:
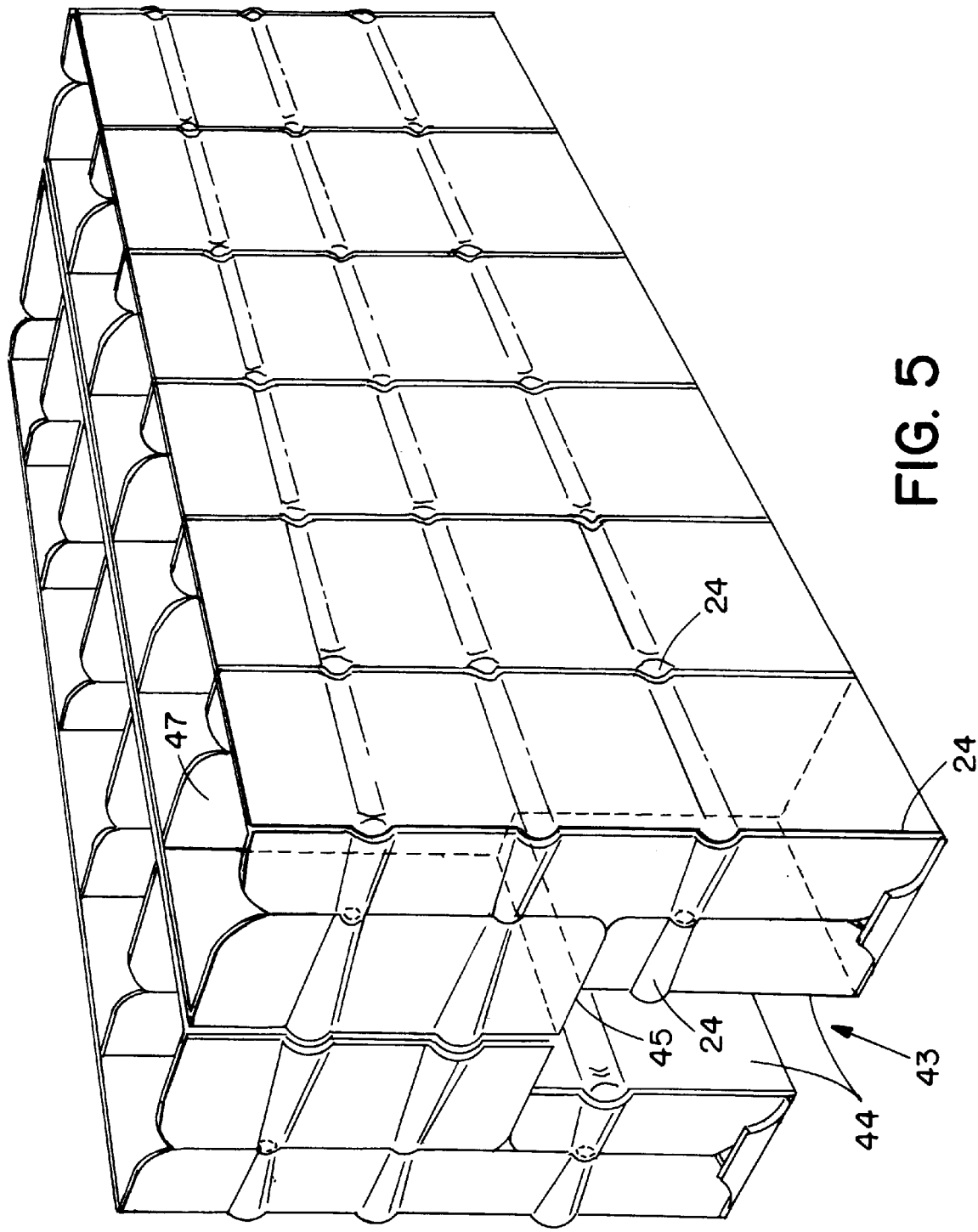
FIG. 5 is a perspective view of an alternative embodiment of a crustacean container formed from a blank according to this invention and suitable for packing clawed lobsters in a second option.
Figure 6:
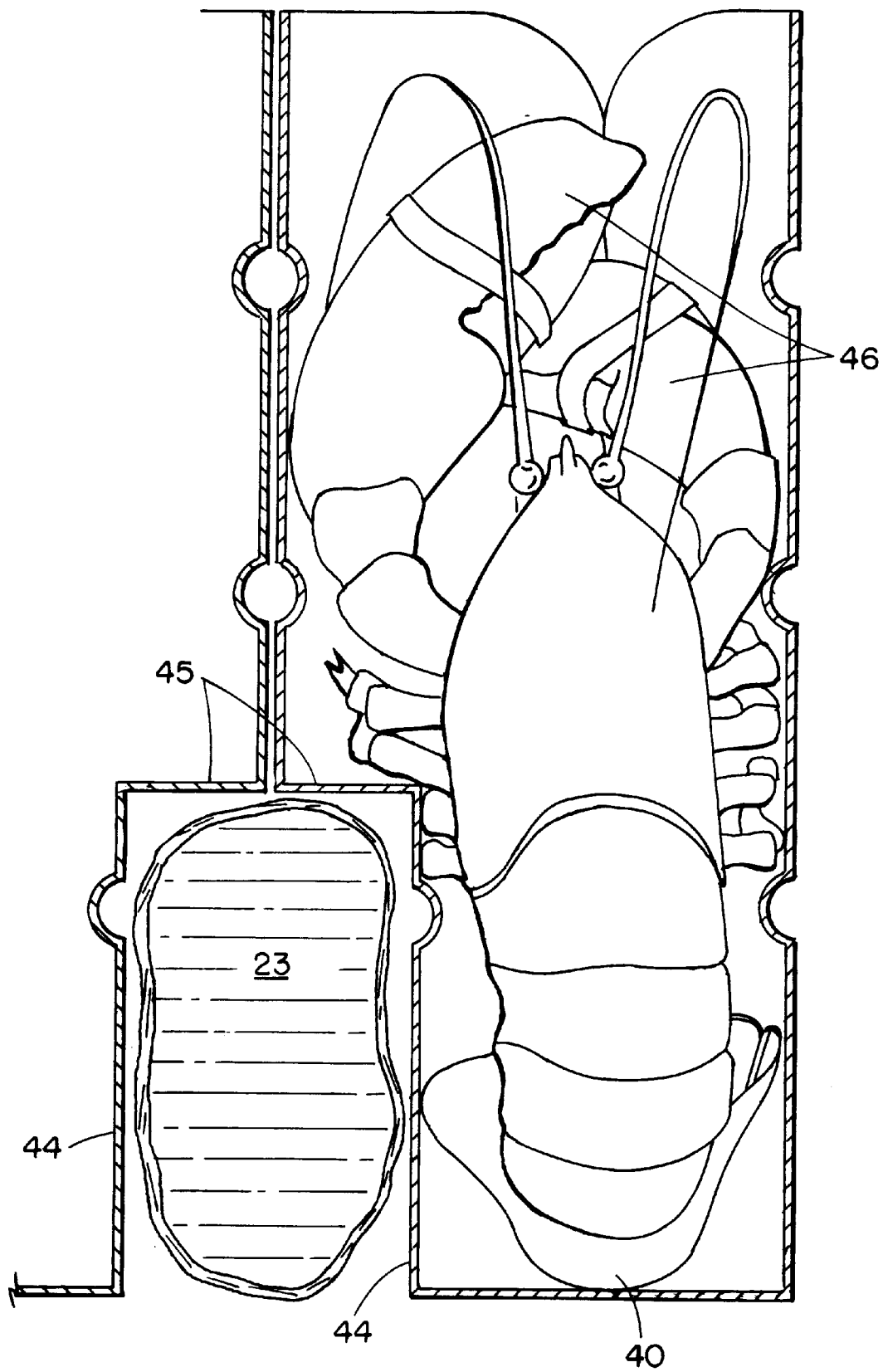
FIG. 6 is a cut-away end view illustrating a clawed lobster packed in a compartment of the container of FIG. 5.

For clawed lobsters or Homarus Americanus, two embodiments of suitable crustacean containers according to this invention are illustrated in FIGS. 4, 5 and 6. Both employ vertical orientation of the lobster loaded with its tail 40 placed at the bottom of the compartment. In FIG. 4, the first option illustrates the packing of a clawed lobster in a compartment with its underside positioned close to the thermal conditioning wall 11. This is ideal for a clawed lobster, a cold water animal, because it results in the sensitive underside of the clawed lobster being in direct contact with the thermal conditioning wall 11.

The second method for employing a crustacean container of the present invention for clawed lobsters is illustrated in FIGS. 5 and 6. In this embodiment, the container has a 90 degree step in its thermal conditioning wall. A cooling chamber 43 is formed by the vertical portions 44 and the horizontal portion 45 of the thermal conditioning wall. It has a lower profile to maximize space when the animal is rotated 90 degrees. The left claw of the lobster receives additional support from the horizontal portion 45 of the thermal conditioning wall. The wider top causes the claws 46 to be drawn in closer to the animal, as illustrated in FIG. 6, thus reducing the height and maximizing the internal volume. The sensitive underside of the lobster is positioned against side walls 47 of the compartment. To maximize cooling in this area, cold air could be ducted from the chamber 43 and directed through the side walls. This method is an efficient utilization of the interior volume of the container.

Figure 7:
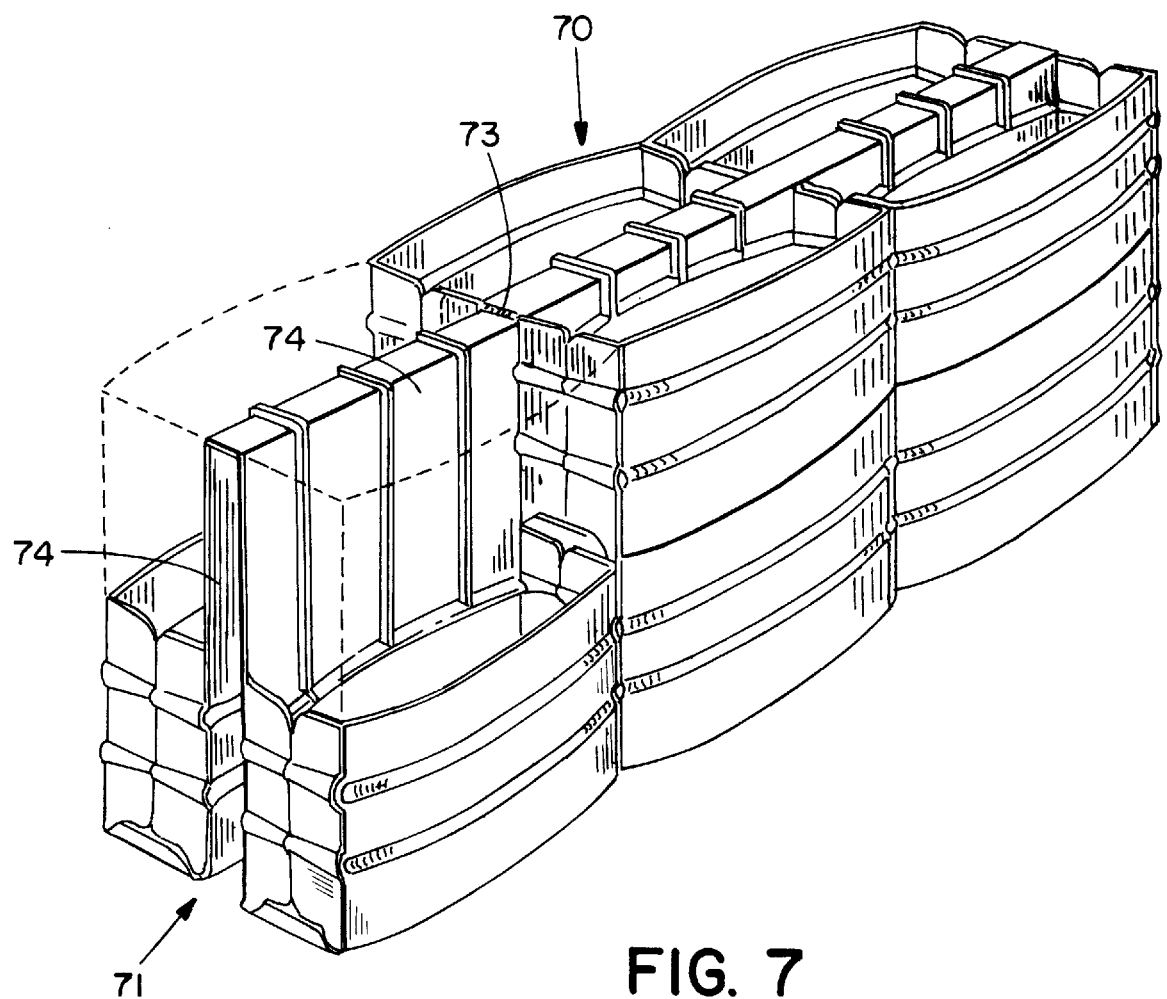
FIG. 7 is a perspective view of another embodiment of a crustacean container according to this invention suitable for containing crabs.
Figure 8:
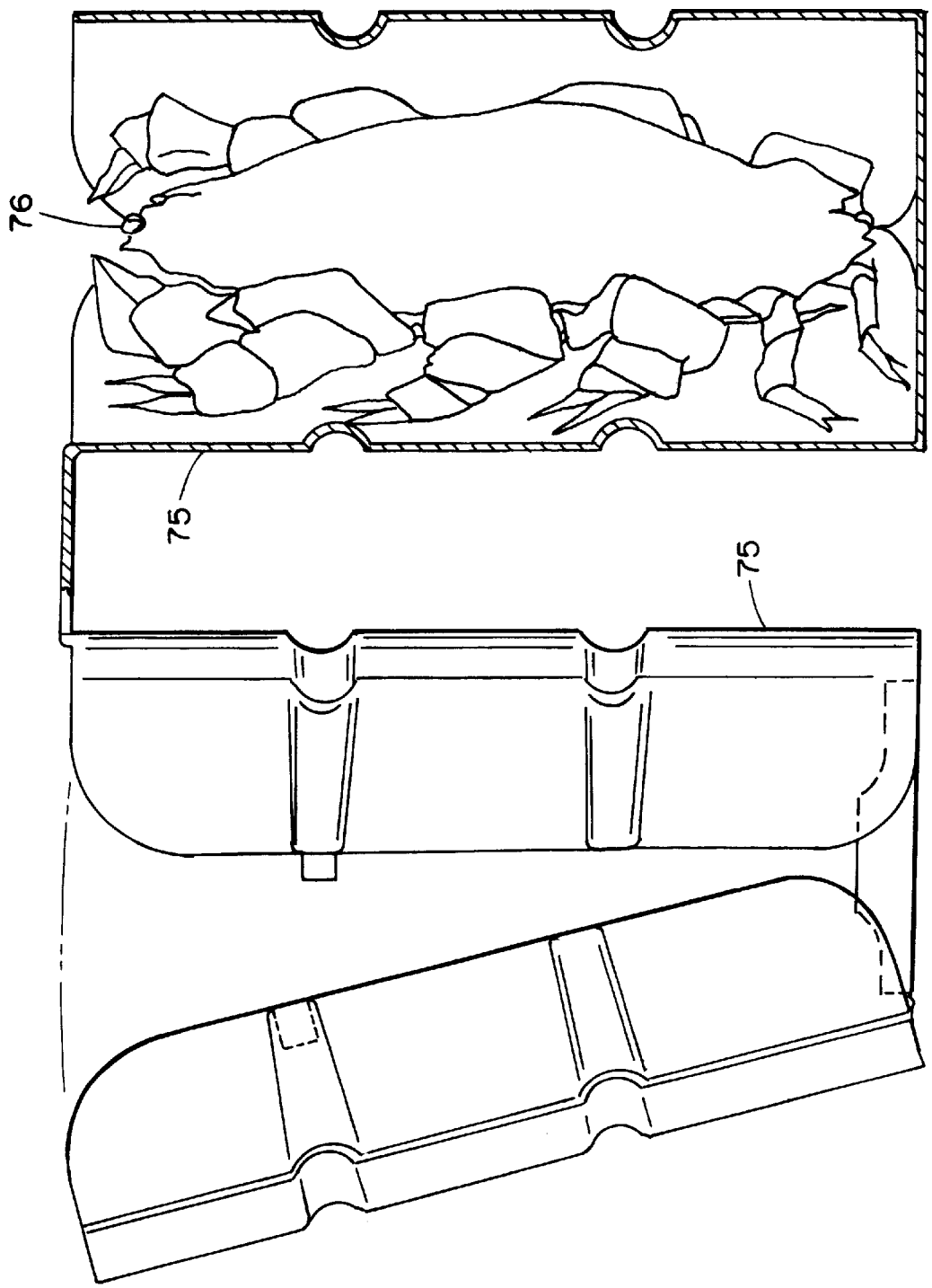
FIG. 8 is a cut-away end view of the container of FIG. 7 illustrating the packing of a crab in one of the compartments.
Figure 9:
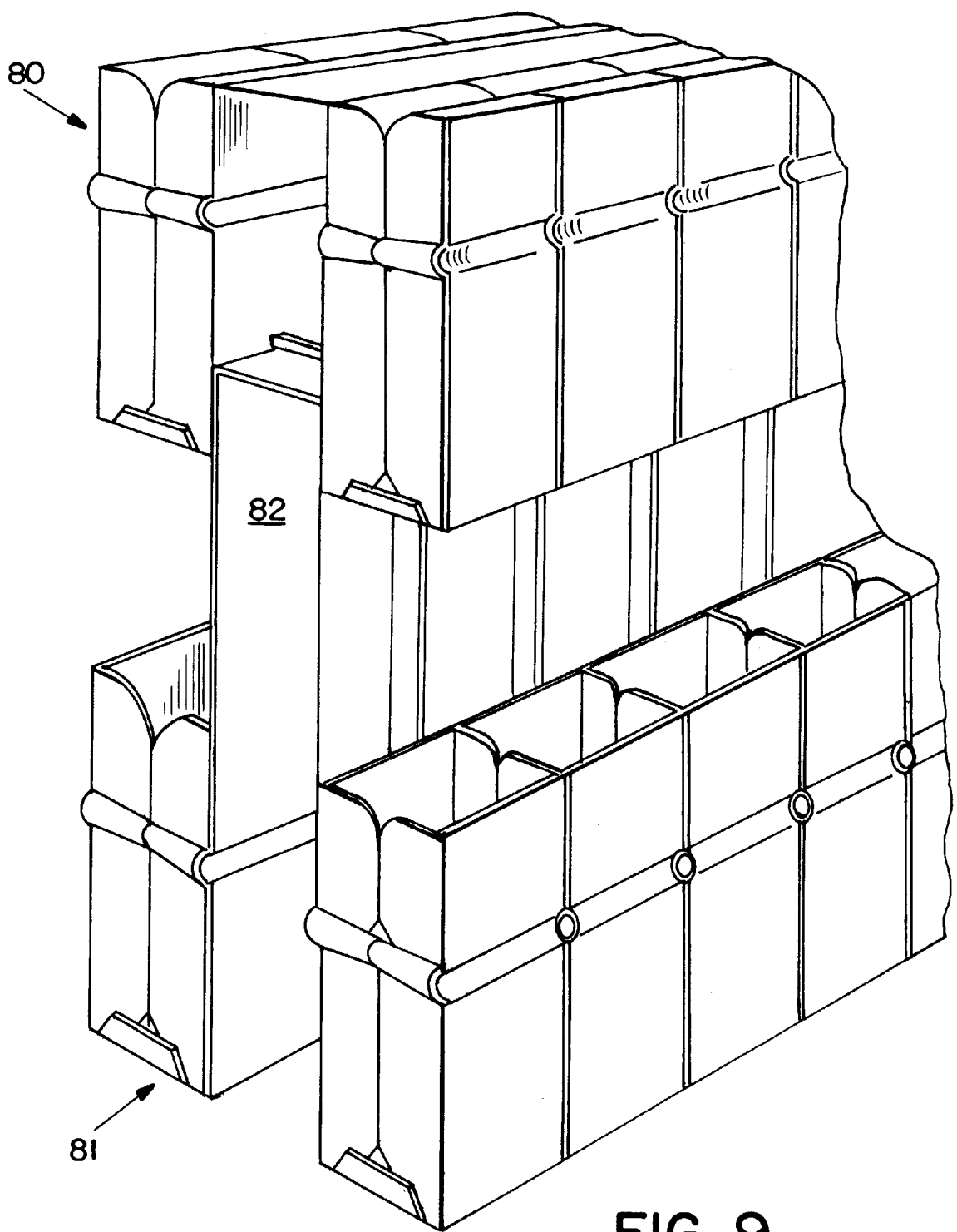
FIG. 9 is another embodiment of a crustacean container according to this invention suitable for containing shrimp or crayfish in its multiple compartments.

A crustacean container according to this invention suitable for containing crabs is illustrated in FIGS. 7 and 8. As illustrated in FIG. 7, this container is shaped to fit crabs and consists of an upper section 70 and a lower section 71 which stack on top of each other. Lower section 71 employs a thermal conditioning wall 74 which is high enough to nest into and support the shorter thermal conditioning wall 75 of the upper portion 70. Upper portion 70 straddles the top of the lower portion 70. This configuration includes a conditioning wall 74 which is common to both upper portion 70 and lower portion 71, thus utilizing one common conditioning medium for both levels to maximize the internal volume. Packing of a crab 76 in one of the compartments of the container illustrated in FIG. 7 is illustrated in FIG. 8. The compartments are shaped to conform to smaller animals. They are loaded in the same manner as the lobster, namely with the tail down and the underside positioned against the thermal conditioning wall. The orientation could change 180 degrees if warm water shrimp were employed.

Figure 10:
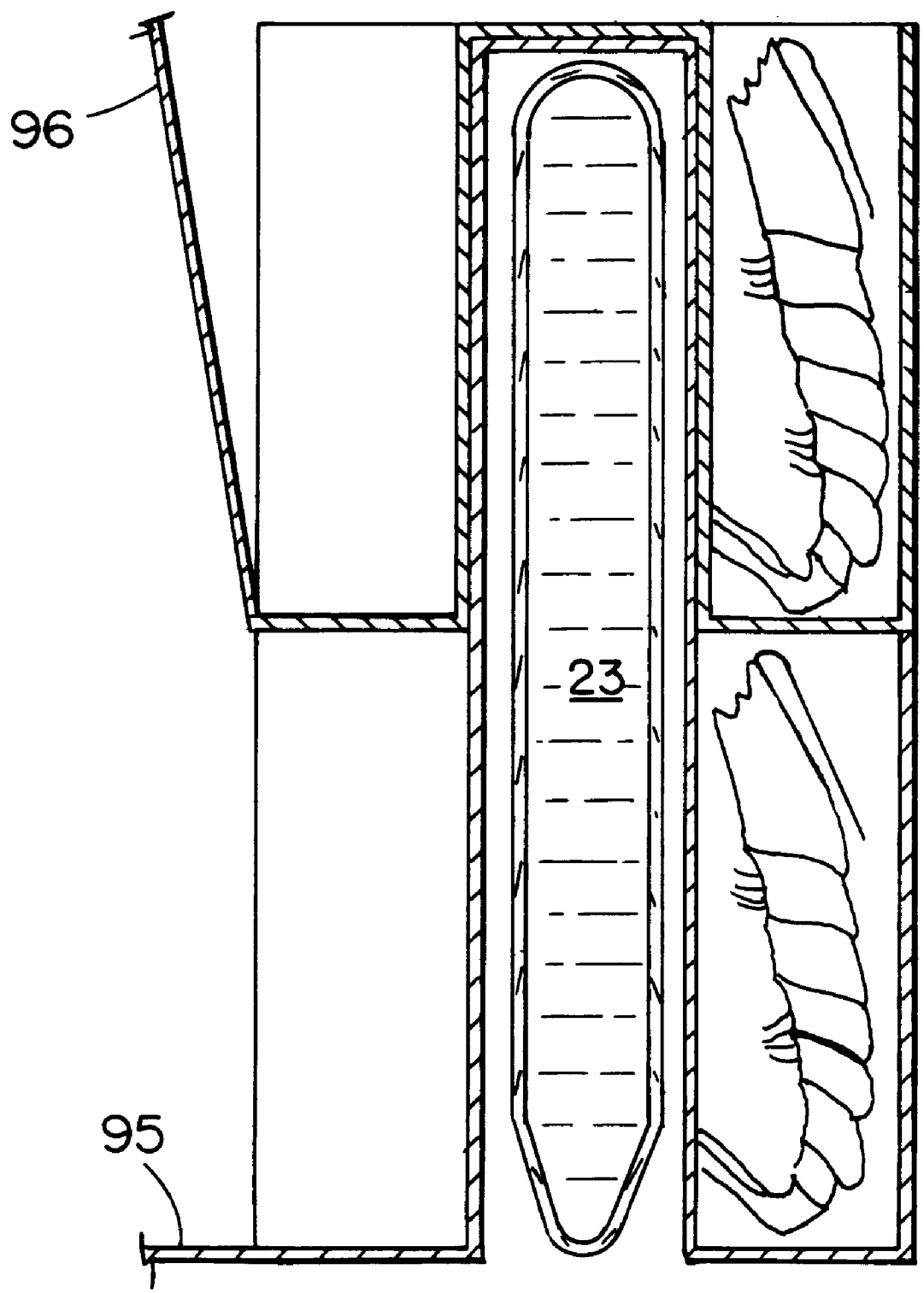
FIG. 10 is a cut-away end view of a crustacean container according to this invention illustrating the packing of shrimp into the compartments of the container.
Figure 11:
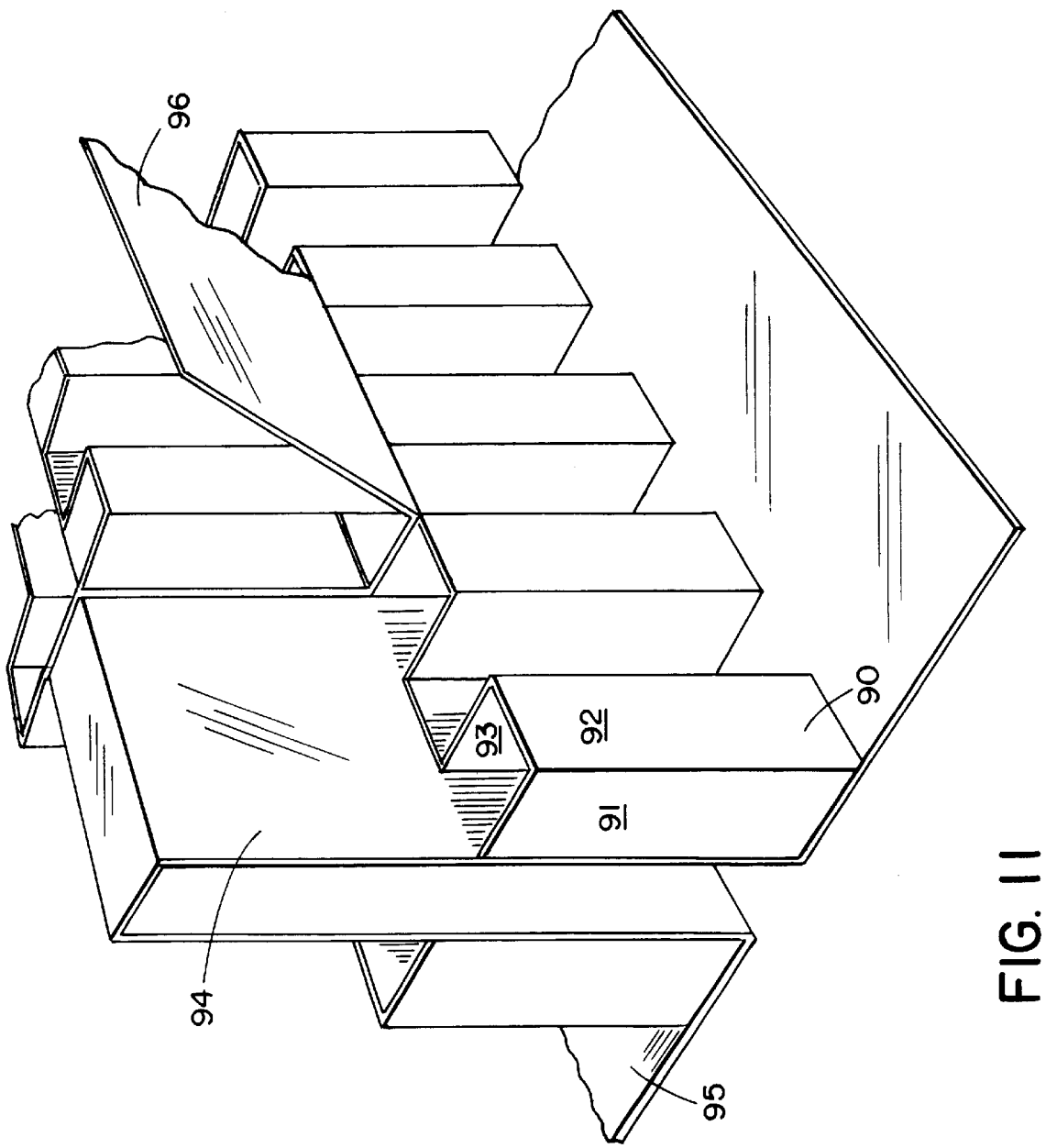
FIG. 11 is another embodiment of a crustacean container according to this invention employing a corrugated form with containment flaps and no ducted side walls.

Another embodiment of a crustacean container according to this invention which is suitable for the packing of shrimp and crayfish is illustrated in FIGS. 10 and 11. The internal volume is maximized by employing a corrugated shape to form cells 90. The corrugated design furnishes three sides, 91, 92 and 93. The fourth side of the compartment is furnished alternately by thermal conditioning wall 94 on one side and the folding flaps 95 and 96, on the opposite sides. This eliminates the hollow side walls to conserve space. Cooling is achieved directly from the thermal conditioning wall 94.

It is possible, of course, to use the crustacean containers according to this invention with other types of outer containers. Some of these will now be illustrated.

Figure 12:
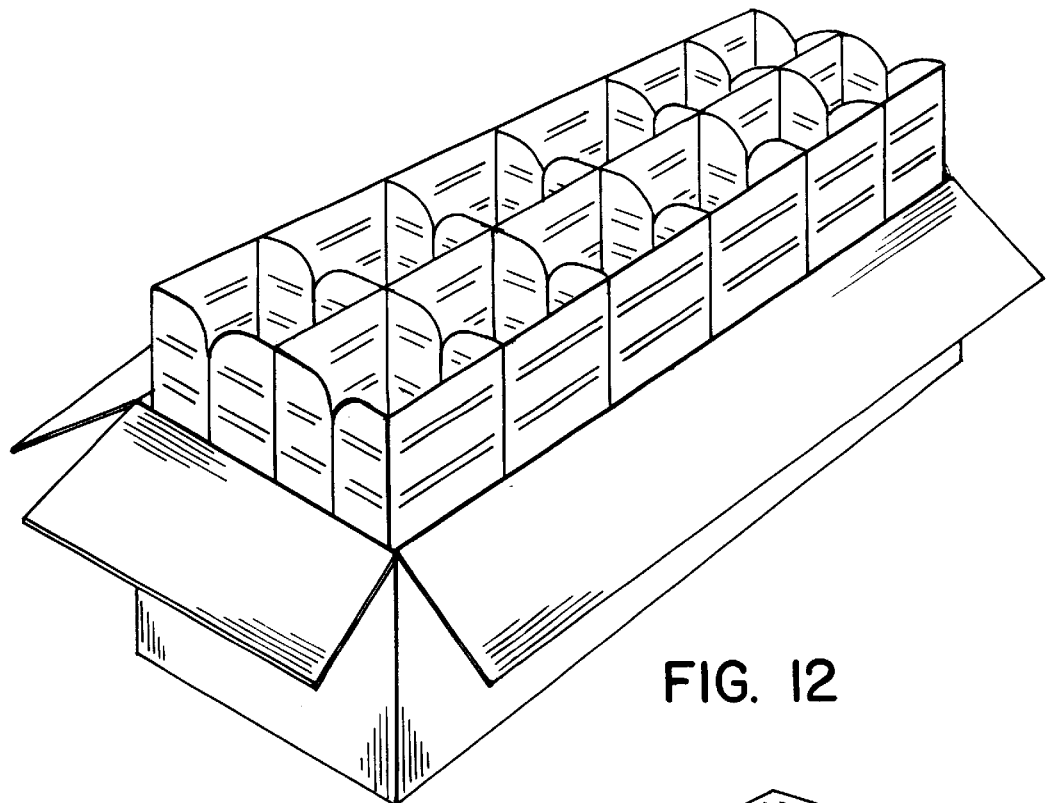
FIG. 12 is a perspective view of a crustacean container according to this invention packed into a standard cardboard container.

In FIG. 12, two six-container crustacean containers are illustrated in a back-to-back relationship packed into a standard cardboard box.

Figure 13:
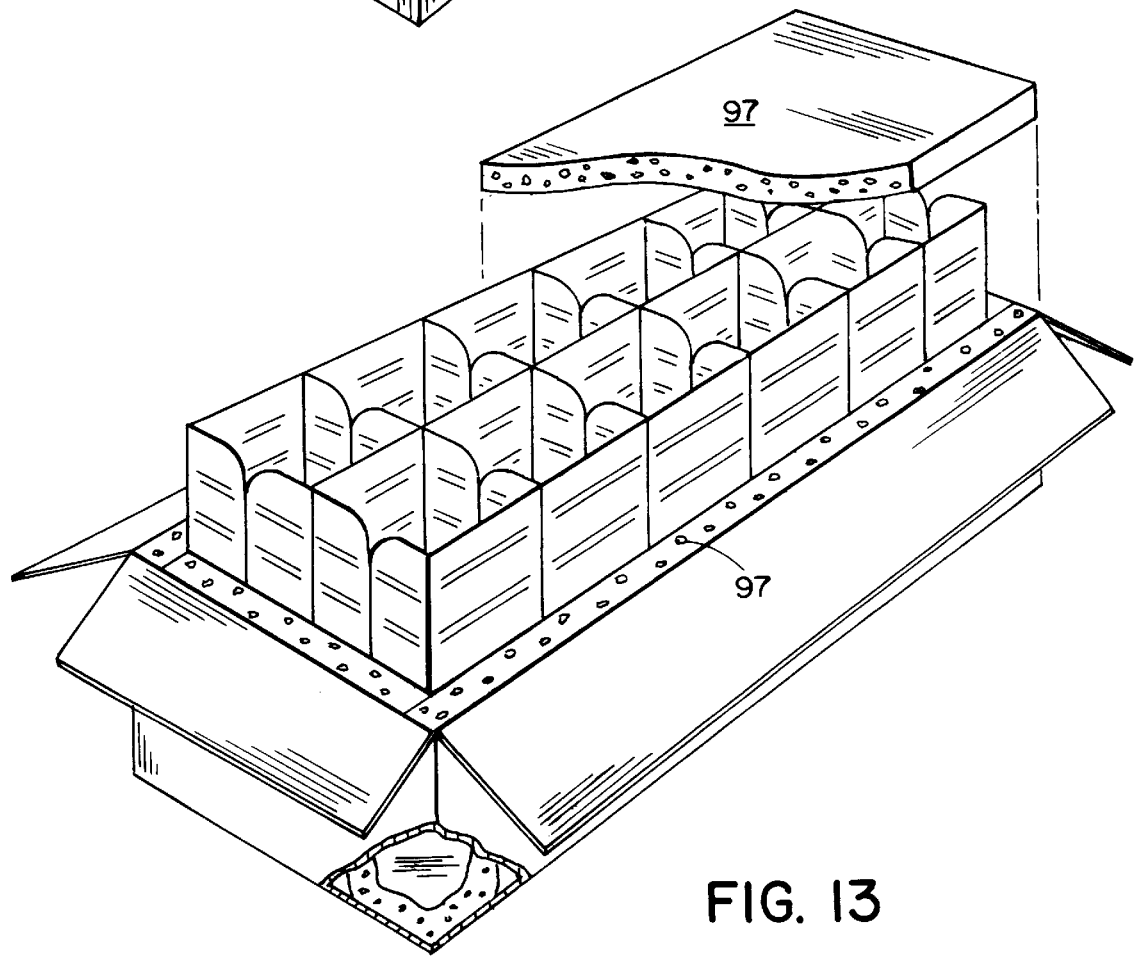
FIG. 13 is a perspective view of a crustacean container according to this invention loaded into an insulated outer cardboard container.

Similarly, FIG. 13 illustrates how these containers might be placed in a cardboard container with thermally insulating material 28.

Figure 13A:
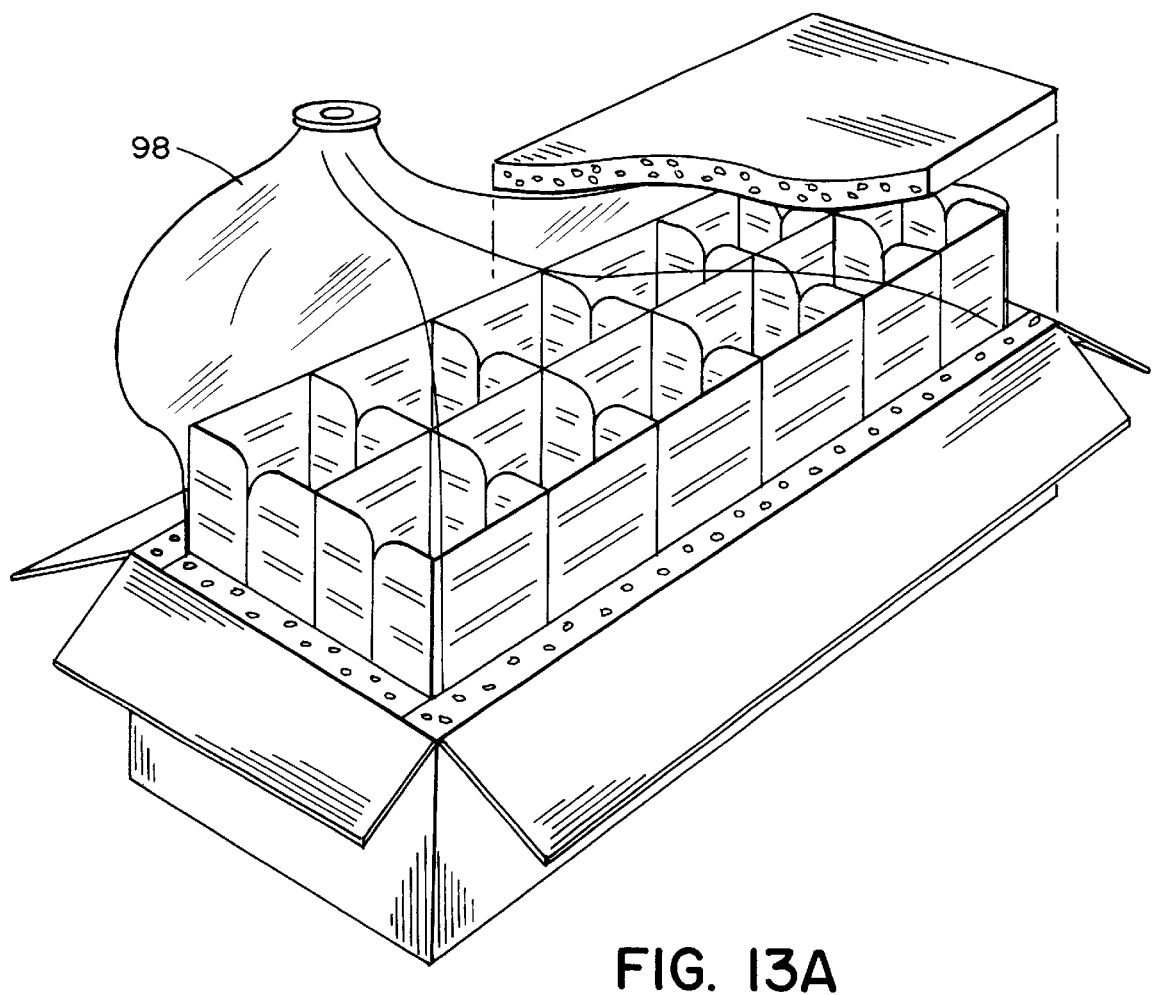
FIG. 13A is a perspective view of a crustacean container according to this invention loaded first into a plastic bag and subsequently into an insulated cardboard container.

FIG. 13A illustrates a similar arrangement but with the addition of a gas-tight polymer bag 98 surrounding the back-to-back crustacean containers. It should be noted that the container compartments act as a shield between the spines on Spiny lobster, for example, and the polymer bag, thereby ensuring that the spines do not puncture the bag and release gasses contained therein. Gasses, such as oxygen, contained within the polymer bag help to provide a less stressful environment for the animals.

Figure 14:
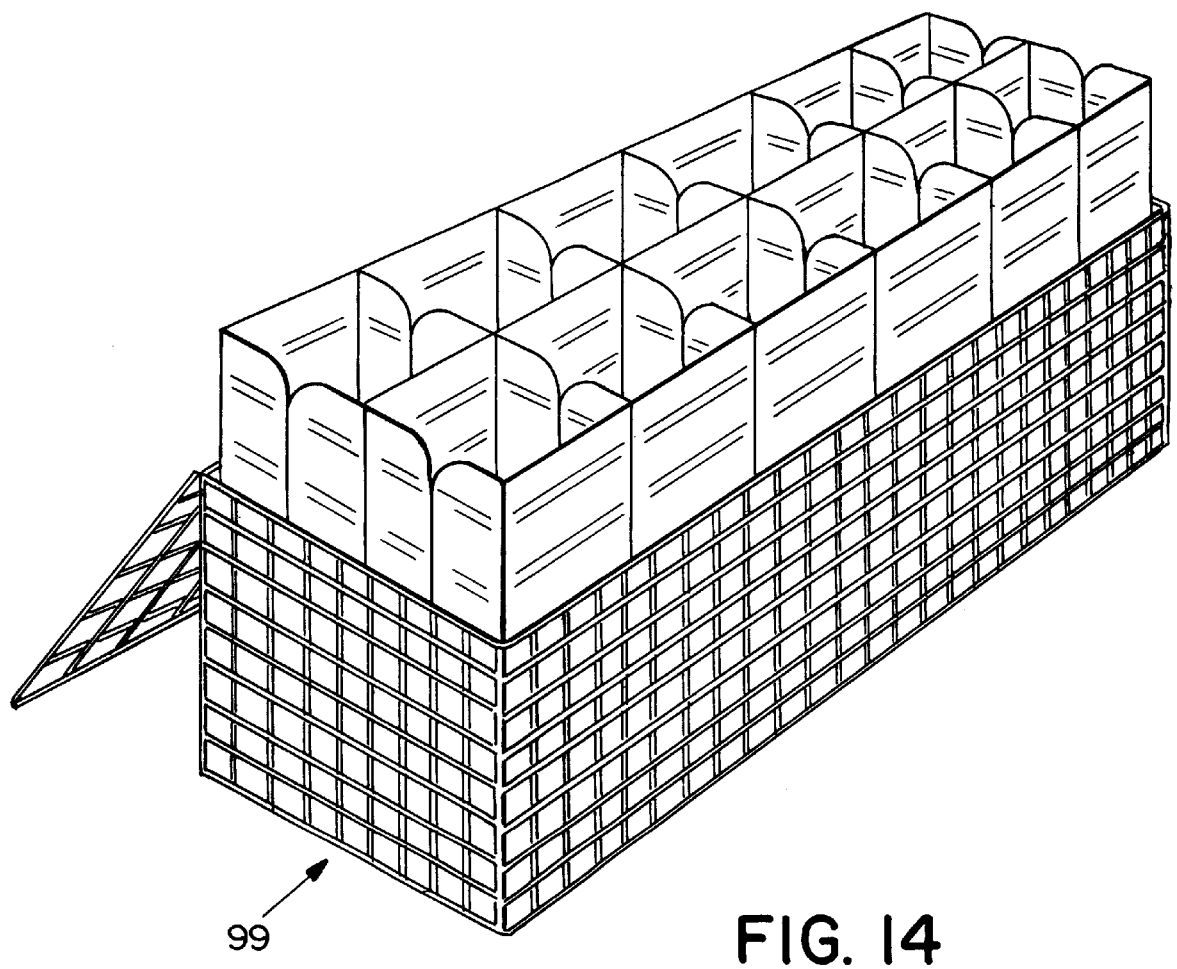
FIG. 14 is a perspective view of a crustacean container according to this invention loaded into a wire cage useful for wet storage of crustaceans.

FIG. 14 depicts two six-compartment crustacean containers placed in a back-to-back relationship and inserted into a cage or wire-type container 99 for wet storage. Such an arrangement could be used, for example, by fishermen on boats or distributors at live lobster holding facilities.

Figure 15:
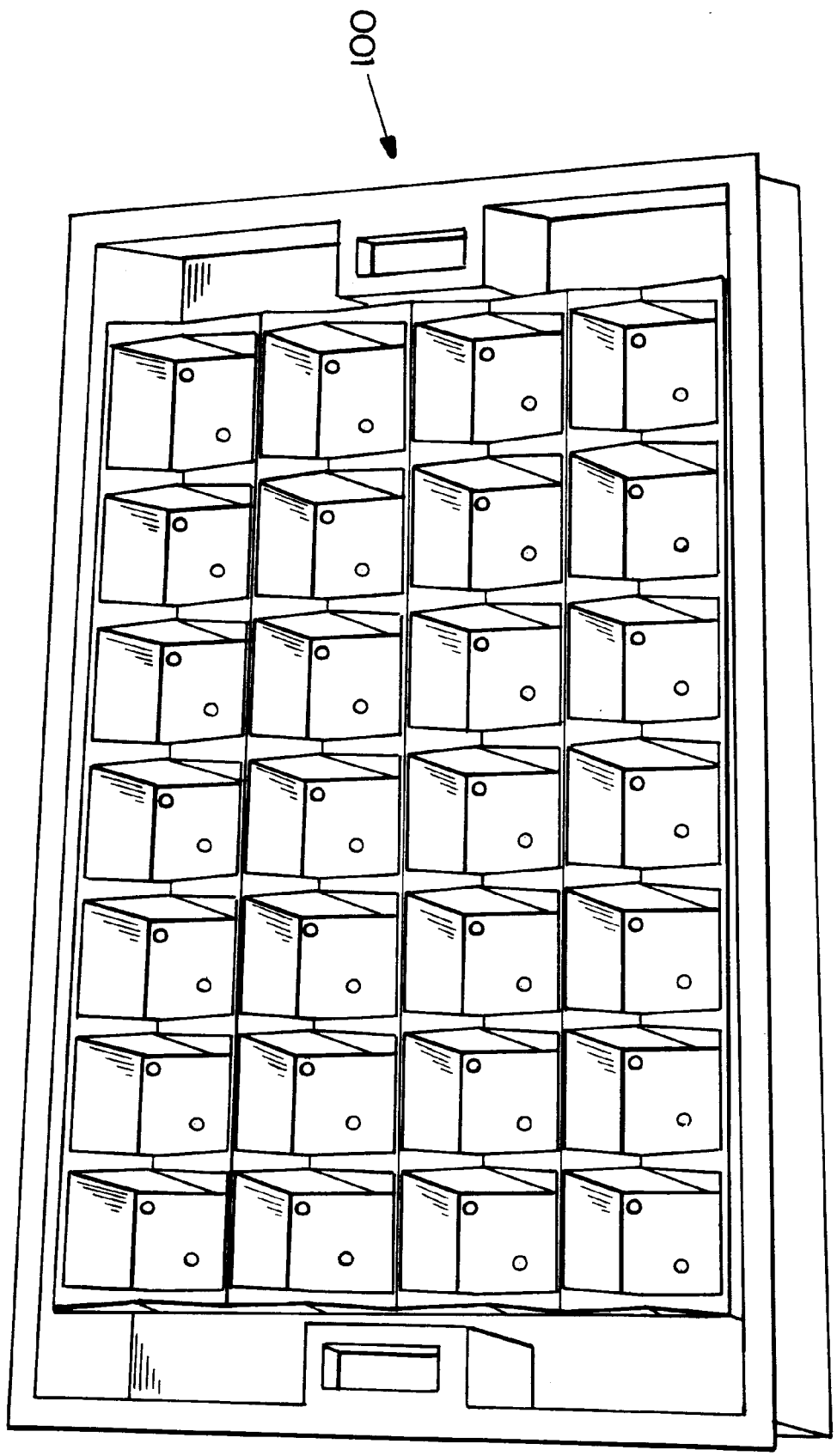
FIG. 15 illustrates a crustacean container according to this invention loaded into a standard fish tote suitable for wet storage of crustaceans contained in the container.

FIG. 15 illustrates four seven-compartment crustacean containers placed in a back-to-back relationship and then inserted into a conventional fish tote 100. The draft angles of the container walls and the draft angle of the fish tote will form a wedge. When a group of containers are inserted into the tote, as shown, they wedge tightly into it. The wedge prevents the crustacean container from reaching the bottom of the tote, leaving a space for water circulation and waste isolation between the bottom of the tote and the bottom of the crustacean container. As shown, the bottom of each tote has a number of drain holes. When the totes are stacked on top of each other, with a water supply over the top tote, the water cascades from the top tote to the bottom tote through the holes in the bottoms.

A large hole at the bottom of the end wall of each tote is employed to facilitate the flushing of waste and other biological matter that has settled in the space between the bottom of the container and the tote. This flushing technique is especially useful when using the system for long term holding, where residual unconsumed food needs to be evacuated. Flushing can be enhanced by injecting pressurized water from the end opposite the flushing outlet or by gravity. The gravity flushing method can be achieved by tilting the stack of totes on the side opposite the flushing outlet, allowing the water and waste in the tote to drain out the lower end.

The container described herein was designed for crustaceans. However, it can also be employed to store or contain other marine animals, or for that matter, other goods, particularly fragile goods.

EQUIVALENTS

Those skilled in the art will recognize, or be able to ascertain using no more than routine experimentation, many equivalents to the specific embodiments of the inventions described herein. These and all other equivalents are intended to be encompassed by the following claims.

What is claimed is:

1. A blank for a multi-sided container for shipping live crustaceans, comprising:
   (a) a base member;
   (b) thermal-conditioning wall members foldably connected to said base member;
   (c) infiltration barrier wall members foldably connected to said base member opposite said thermal-conditioning wall members, said thermal-conditioning wall members and said infiltration wall members having partial side wall members extending substantially orthogonally therefrom in an aligned relationship whereby said thermal-conditioning wall members and said infiltration barrier wall members are foldable to bring their partial side wall members into contact thereby forming multi-sided containers for live crustaceans, said thermal-conditioning, infiltration and partial side wall members being sized so that, upon folding of the blank to bring the partial side wall members of the thermal-conditioning wall members into contact with the partial side wall members of the infiltration barrier wall members, a plurality of self-supporting compartmentalized modules are formed, each module being capable of supporting a single crustacean in an upright position, and providing further that said thermal-conditioning wall members are shaped to conform and support a single crustacean in an upright position and to provide a chamber for thermal-conditioning media when two containers are placed in a back-to-back relationship.

2. A blank of claim 1 wherein said partial side wall members have means for locking the blank in its folded position.

3. A blank of claim 1 wherein said crustaceans are lobsters.

4. A container formed from the blank of claim 3.

5. A container formed from the blank of claim 1.

* * * * *